United States Patent [19]

Clark

[11] Patent Number: 5,182,878

[45] Date of Patent: Feb. 2, 1993

[54] FISH LURE HOLDER

[76] Inventor: Brant V. Clark, 1103 York Rd., Cherry Hill, N.J. 08003

[21] Appl. No.: 662,450

[22] Filed: Feb. 28, 1991

[51] Int. Cl.⁵ .............................................. A01K 97/06
[52] U.S. Cl. .................................... 43/57.1; 43/57.3; 43/27.4
[58] Field of Search ...................... 43/57.1, 57.3, 54.1, 43/27.4, 27.2

[56] References Cited

U.S. PATENT DOCUMENTS

| | | | |
|---|---|---|---|
| 2,158,947 | 5/1939 | Purdum | 43/27.4 |
| 2,501,425 | 3/1950 | Valentine | 43/57.1 |
| 2,614,359 | 10/1952 | Galbraith | 43/57.1 |
| 2,708,326 | 5/1955 | Bleckman | 43/57.3 |
| 3,024,563 | 3/1962 | Meisetschlager | 43/57.3 |
| 3,466,785 | 9/1969 | Shook | 43/27.4 |
| 3,600,839 | 8/1971 | Waller | 43/57.3 |
| 3,775,894 | 12/1973 | Goddard | 43/57.3 |
| 3,945,144 | 3/1976 | Purselley | 43/27.4 |
| 4,681,220 | 7/1987 | Beneke | 43/57.1 |
| 4,742,640 | 5/1988 | Moore | 43/57.1 |

Primary Examiner—Kurt Rowan
Attorney, Agent, or Firm—Nicholas DeBenedictis

[57] ABSTRACT

The present invention concerns a holder for barbed lures or hooks. The lure holder is designed to hold barbed hooks or lures readily accessible yet securely particularly when the holder is mounted in the fishing area of a boat. The barbed portion of the hook or lure is inserted into an opening in the holder and is held with the barbed portion recessed within the holder. A mounting bracket is designed for mounting the holder onto a boat and preferably allows the lure holder to be readily unmounted for stowage.

1 Claim, 2 Drawing Sheets

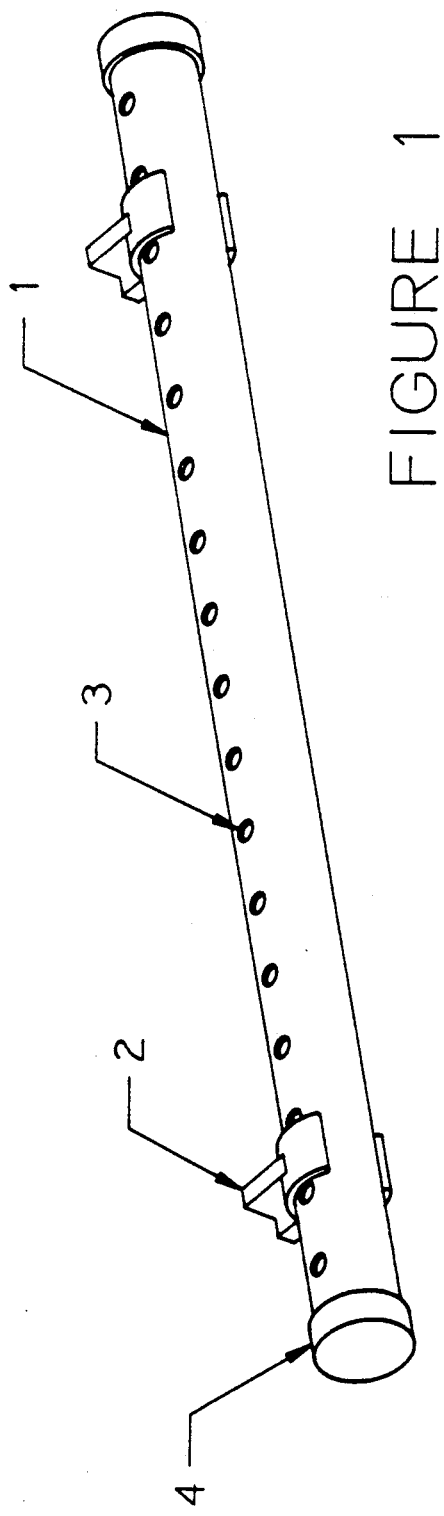
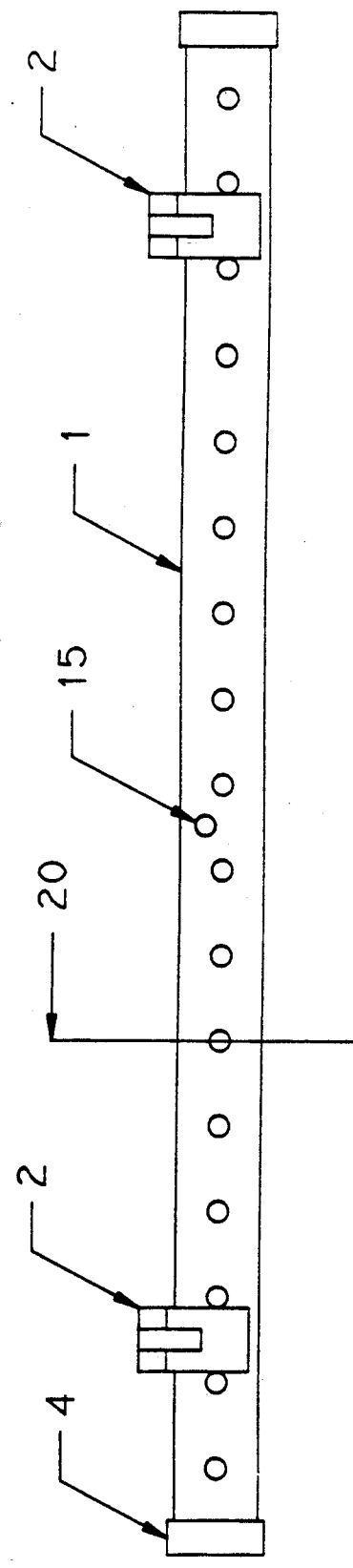

SECTION 20-20

FISH LURE HOLDER

SUMMARY OF THE INVENTION

The present invention provides a holder for a plurality of fish hooks and lures having a barbed point, and suitable for mounting on a boat comprising:
a body having a plurality of openings; and,
means for mounting the body onto a boat with the openings facing in a generally upward position;
said body having a length of at least ten inches and a width of from 0.25 inches to 5.5 inches;
each of said openings providing a minimum opening of from 0.06 inches and a maximum opening equal to or greater than the minimum and less than about 0.6 inches.

DESCRIPTION OF THE DRAWINGS

FIG. 1 depicts the fish lure holder of the present invention in perspective view.

FIG. 2 is a top view of the holder.

DESCRIPTION OF THE PRIOR ART

Fishing lure holders adaptable for use on pleasure fishing craft are typically rigidly mounted and/or enclosed. Often there is no lure holder in the fishing area but instead fishing lures are kept in portable tackle boxes or haphazardly strewed about. U.S. Pat. No. 4,901,899 discloses a tackle carrier of the type that uses pouches. U.S. Pat. No. 4,770,327 discloses a releasibly mounted tackle holder which uses a tackle box for holding the lures. U.S. Pat. No. 4,516,707 discloses an elaborate contraption for storing and transporting fishing lures in comparison to the present invention. U.S. Pat. No. 4,383,385 discloses a lure container that utilizes a tubular member but is otherwise quite different than the present invention. A fishing lure holder having similar utility to the present invention is disclosed in U.S. Pat. No. 4,375,137 but the complex spring mechanism for obtaining such utility is quite different than the simple design of the present invention.

DETAILED DESCRIPTION OF THE INVENTION

Figure 5:
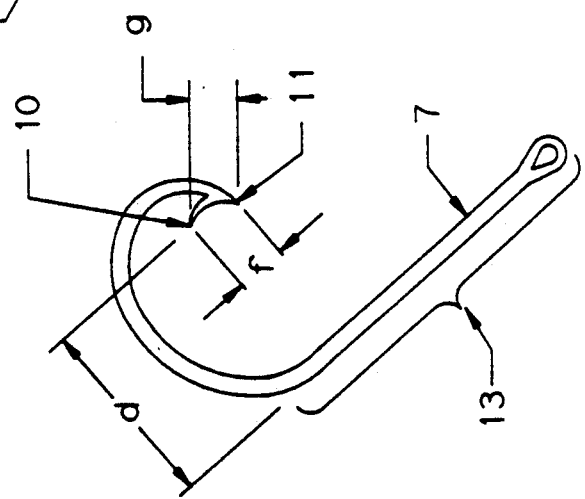
FIG. 5 shows a barbed fish hook.
Figure 3:
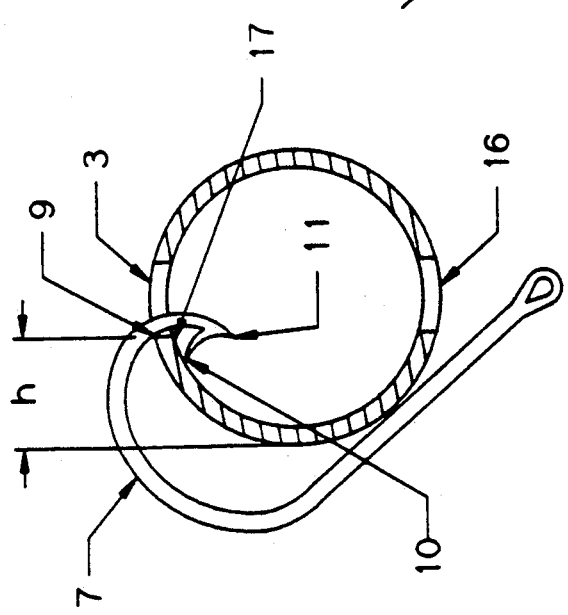
FIG. 3 is a sectional view along line 20,20 of the holder of FIG. 2 with a barbed hook shown in the stored position.

The relative dimensions of the main body of the fish lure holder (1) and the barbed hook provide for easy insertion and removal of the hook while impeding or preventing the hook from inadvertently coming out of the lure holder due to bouncing, jarring or rocking of a boat to which the fish lure holder has been mounted with brackets (2). The holder is designed to safely hold the hook or lure (7) with the hook point (11) and the barb point (10) within the body of the holder (1) as shown in sectional FIG. 3. The opening (3) in which the hook or lure point is inserted for storing the hook must have a minimum dimension greater than dimension "f" shown in FIG. 5, which is the offset distance of the barb point from the hook. The dimension of opening (3) is preferable less than the distance between the barb point and the hook point for the preselected hook sizes for which the a particular holder is designed. This is shown as dimension "g" in FIG. 5 which is typically from about 0.06 inches (0.15 cm) to about 0.6 inches (1.5 cm) although up to about 1 inch can be utilized particularly for large hooks. Accordingly, opening (3) should be at least about 0.06 inches with from 0.06 inches to about 1.0 inch being preferred and from 0.10 inches to 0.25 inches being particularly preferred. Although appearing to be loosely hung, the barbed hook (7) in FIG. 3 is securely held particularly when the maximum dimension of opening (3) is less than dimension "g" in FIG. 5. Hook (7) will not fall out of the holder body (1) due to normal jarring, rolling or bouncing of a boat to which the holder is attached. Dimension "h" of the lure holder is the perpendicular distance from the nearest edge of opening (3) to an adjacent side of body (1) as shown in FIG. 3. Dimension "h" is preferably less than (e.g. 75% of) dimension "d" shown in FIG. 5 which allows the hook to hang with it's shank facing generally downward with the barb under the upper surface of body (1). Dimension "d" shown in FIG. 5 is the perpendicular distance between the point (11) of the hook and the shank of the hook. Dimension "d" is selected depending on the size of the hook that the holder is designed to readily accommodate which depends upon the size of the fish that the hook is designed to catch. For small fish, "d" can be as small as about 0.15 inches (0.38 cm.) which corresponds with a minimum preferred magnitude for "h" of about 0.12 inches (0.29 cm). For very large salt water game fish, "d" can be as large as about 3 inches (7.6 cm) which corresponds to a preferred magnitude for "h" of about 2.25 inches (6.4 cm). Accordingly the preferred value for "h" is from about 0.12 inches to about 2.25 inches (0.29 cm to 7.6 cm). The body of the holder (1) preferably has a tubular (round) cross-section as shown in FIG. 3 with a diameter from about 0.25 inches (0.63 cm.) to about 5.5 inches (14 cm.). Cross-sectional shapes other than round can be utilized for the body (1) with widths in the same range as the diameters preferred for tubular holders (0.25 in. to 5.5 in.). The body can have a plurality of values for dimension "h" thereby accommodating a greater range of hook sizes. FIG. 2 shows a way of obtaining two values for "h" for a single opening (15) by offsetting the opening from the centerline of the other openings (3). Alternatively, different values for "h" for different openings (3) on the same body (1) can be obtained by vary the diameter of body (1) or the width of a body having a non-circular cross-section. The body (1) can be solid with openings (3) recessed into the body such as a solid rod however body (3) is preferrably hollow so that opening (3) has a top lip (17) as shown in FIG. 3 under which the barb is positioned. This positioning of the barb occurs automatically by gravity when opening (3) is facing upward and, at the same time the shank will be facing downward when "h" is less than "d".

With the above understanding of the relationship among the dimensions of opening 3, the size range for hooks for which the lure holder is designed to safely hold, the distance "h" from the edge of opening (3) to the edge of body (1) and the width of the body (1) a person with ordinary skill could select appropriate proportions for body (1) and opening (3) and locate opening (3) with respect to the edge of body (1) for any preselected hook size or range of sizes.

The preferred embodiment or best mode presently contemplated for practicing the present invention is shown in the drawings. Opening (3) is preferably circular as shown in FIG. 1 although other shapes such as square, rectangular of elliptical could be utilized. The minimum dimension for opening (3) is greater than the width of the barb ("f" in FIG. 5) and is preferable at least about 0.06 inches (0.15 cm.) with from 0.10 inches (0.25 cm.) to 0.25 inches (0.64 cm.) being particularly preferred for hooks particularly suitable for fish in the 1 to 15 pound range. Opening (3) is preferable located along the center axis of body (1) as shown in FIG. 3 although opening (3) can be offset from the center axis. The holder should be mounted with opening (3) in the upward direction as shown in FIG. 1. The spacing between opening (3) and an adjacent opening (center to center) is at least about 0.06 inches (0.15 cm) with from about 0.5 inches to about 1.5 inches (1.27 cm to 3.81 cm) being particularly preferred. The holder can be almost any length accommodating increasing numbers of openings (3) for holding lures as the length is increased. Lengths of at least 10 inches (25.4 cm) and particularly from 12 inches to 48 inches (30.5 Cm to 122 cm) are preferred and can be easily mounted in the fishing areas of most pleasure boats. On commercial boats, lengths of about 10 feet to about 25 feet could be utilized (25 cm to 68 cm).

Figure 4:
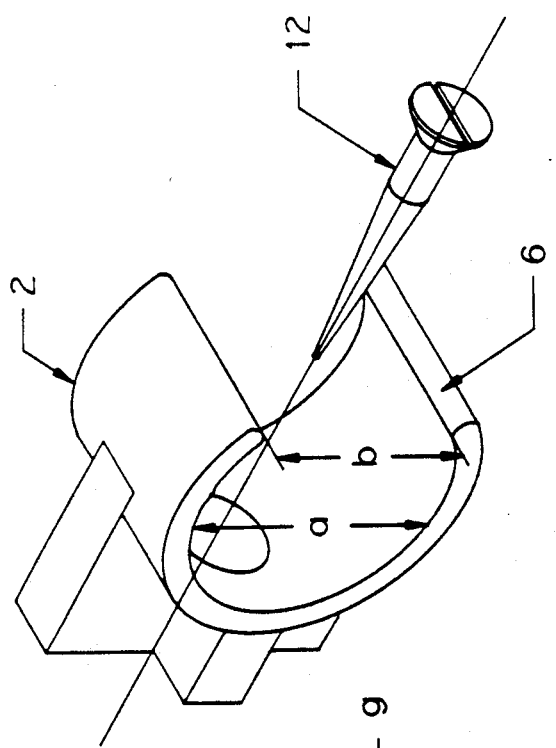
FIG. 4 is a perspective view of a mounting bracket shown in FIG. 2.

Mounting means (2) for mounting the holder to a boat bulkhead or other secure surface of the boat is provided so that opening (3) is at least 0.40 inches from the bulkhead or other secure surface with 1 inch to 5 inches being preferred. The mounting means (2) has a first end being shaped and adapted for holding the body of the lure holder (1) and a second end (preferably opposite the first end) and adapted for securing the mounting means to the bulkhead. Preferably the mounting means (2) has means for releasibly securing either the body (1) or the boat to the mounting means. Means for releasibly securing the mounting means to the bulkhead or to some other component of the boat is shown as screw (12) in FIG. 4 which is merely illustrative of any of many suitable means known to those skilled in the art. More preferably, the releasible means is part of the first end (6) of mounting means (2) as shown in FIG. 4. In the embodiment shown in FIG. 4, the first end (6) releasibly secures body (1) by the combination of the first end being flexible with dimension "a" being about equal to or slightly less than the diameter of body (1) and dimension "b" being less than dimension "a". A non-circular, cross-sectional shape for body (1) (particularly where it contacts releasible means (6)) and a conforming, non-circular shape for releasible mean (6) would lessen any tendency of body (1) to rotate when mounted.

A pair of mounting means (2) as shown in FIG. 4 is the preferred means for mounting the holder body (1). The mounting means shown in FIG. 4 is a commercially available tube hanger and it is particularly suitable for use with a round body (1) made from tubing. One end of such a tube hanger has a mating shape to the tubular body (1) and has an opening slightly smaller than the minimum cross-sectional dimension of the body (1) so that inserting the body (1) into mounting means (2) through said slightly smaller opening flexes the material of the mounting means and enlarges the opening to accommodate the body (1) and securely hold the body (1). Release occurs when a force generally equal to and in the opposite direction of the insertion force is applied to the body (1). Preferably the mounting means is made of a flexible material. "Flexible" as used herein means capable of flexing sufficiently to function as specified above when subjected to an insertion force through body (1) of a magnitude easily achievable by a human being (e.g. 20 pounds force). Suitable materials of construction include rubber, flexible plastics, such as polyethylene, polyurethane or polyproplyene or resins. Metals or wood could also be used for the mounting means although not readily suitable for the flexible mounting method for releasibly mounting the body (1) to the mounting means (2). However, many methods are suitable for releasibly mounting body (1) to the mount (2) such as a post (not shown) on an end of mount (2) for inserting through holds in body (1).

Body (1) is preferable made of round commercially available tubing (hollow having sufficient wall thickness to be self supporting (rigid) between mounting brackets (2). Wall thicknesses of from about 1/32 of an inch to about ¼ of an inch are suitable for most lengths. The tubing is cut to appropriate length and drilled with holds for openings (3) and preferable an opening (16) opposite opening (3) for drainage as shown in FIG. 1. Particularly suitable is bright finished anodized aluminum pipe. Flexible end caps (4) are preferable provided and secured to the ends of body (1). End caps are preferable made of plastic or rubber and particularly suitable are commercially available furniture leg tips of the type used on foldable aluminum furniture such as lawn furniture.

I claim:

1. A holder for barbed fish hooks or lures and suitable for mounting on a boat comprising:

a generally circular, hollow and tubular body having a plurality of openings, a length of from 1 foot to 25 feet, a diameter of from 0.25 inches to 5.5 inches and a wall thickness of from 1/32 of an inch to 174 of an inch;

each of said opening having a minimum opening of 0.06 inches and a maximum opening of less than 0.60 inches, and a distance between the center of adjacent openings of from 0.5 inches to 1.5 inches; and means for mounting the bracket onto a boat with the openings in said body facing in a generally upward position, said mounting means comprising at least two brackets with the first and of each bracket having a mating surface for the circular cross section of said body and an opening to said mating surface that is less than the diameter of said body with said first end being made of a material sufficiently flexible to allow insertion of the body through said opening to said mating surface, and a second end of said bracket having means for affixing said bracket to the boat.

* * * * *